April 29, 1924.
J. F. ARNOLD
1,492,234
GATE VALVE
Filed Sept. 8, 1920
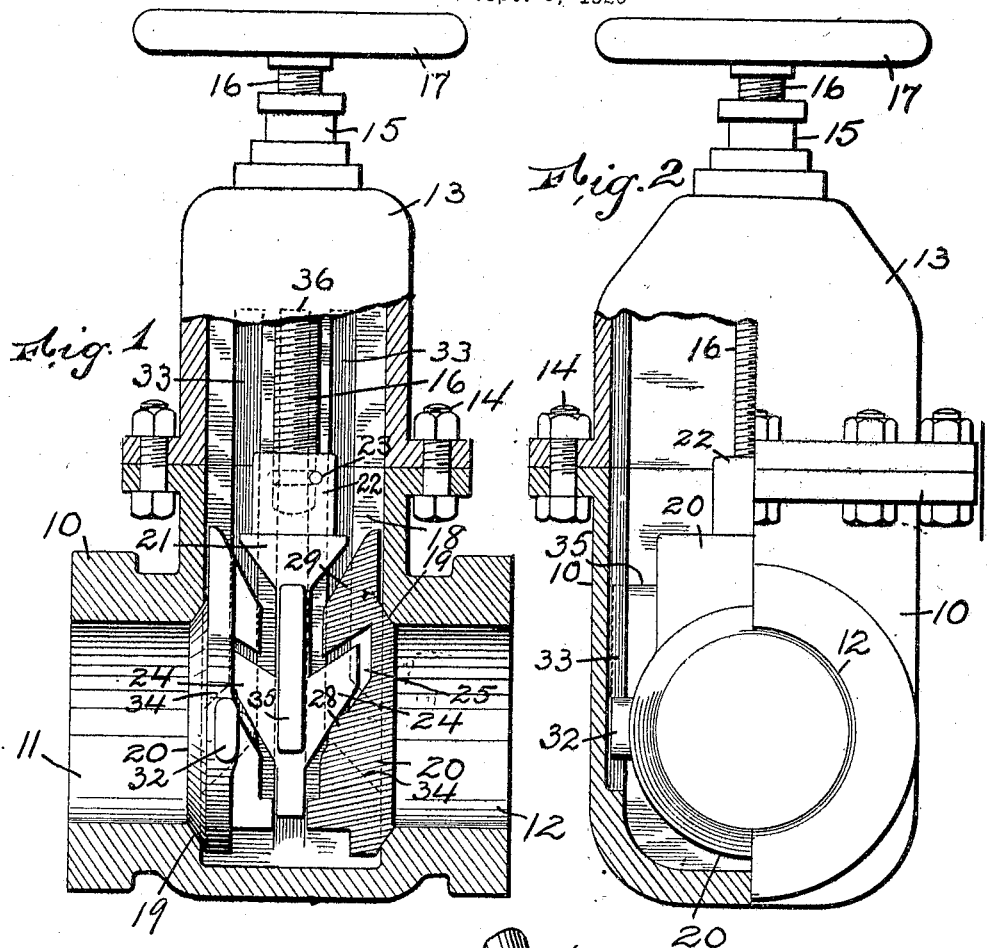
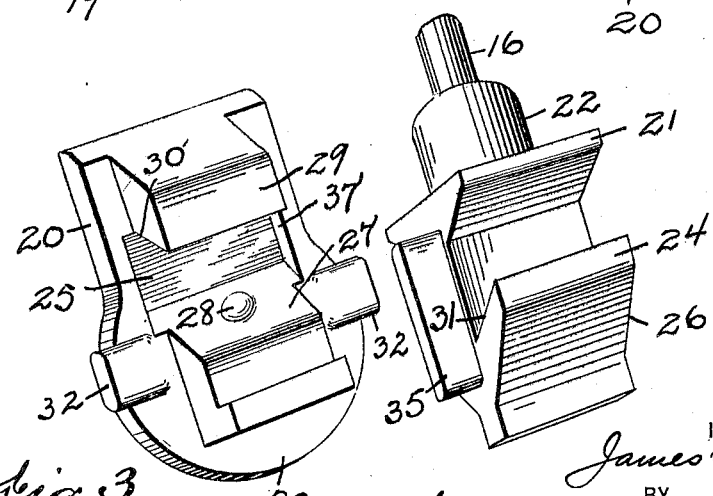
INVENTOR
James F. Arnold,
BY
Wm H Canfield
ATTORNEY.

Patented Apr. 29, 1924.

1,492,234

UNITED STATES PATENT OFFICE.

JAMES F. ARNOLD, OF ELIZABETH, NEW JERSEY.

GATE VALVE.

Application filed September 8, 1920. Serial No. 408,863.

*To all whom it may concern:*

Be it known that I, JAMES F. ARNOLD, a citizen of the United States, and a resident of Elizabeth, county of Union, and State of New Jersey, have invented certain new and useful Improvements in Gate Valves, of which the following is a specification.

This invention relates to an improved gate valve in which the valves which fit on the valve seats of the casing are suspended from the valve stem when they are not in engagement with their valve seats, and when so suspended the faces of the valves are inside the plane of the vlave seats so that the valves are not spread or moved laterally along the valve seats, but are moved flatwise away from the valve seats and are then moved edgewise when out of engagement with the valve seats.

The valve is designed to provide further a succession of movements of the valves relative to their seats, which succession or sequence of movements is due to the construction of the casing, the valves and a supporting block for the valves, the supporting block being actuated from the valve stem and being designed to have a tendency to move the valves flatwise toward each other when the block moves upward relative to the valves, and is designed to move the valves outward, that is, to spread them to contact with the valve seats, when the block moves downward relative to said valves, the valves, of course, being supported by means other than the block when such movement downward relative to the valves is established.

The invention is designed to provide a valve which can be used in any position with the operating wheel either at the top, at the bottom or at the side, and which can be operated to seat the valves on their seats without danger of the pulsation, due to the operation of a pump, or other cause of vibration, marring or damaging the face of the valve or of its seat at the points where they are in contact when the valve is shut.

The invention is illustrated in the accompanying drawing, in which Figure 1 is a section through a gate valve made according to my invention, the upper part being in section, and the block and one of the valves being shown in section. Figure 2 is an end view of the gate valve shown in Figure 1, the left hand lower part of the valve casing being shown in section. Figure 3 is a perspective view of one of the valves, looking at its rear face, and Figure 4 is a perspective view of a block used for actuating the valves.

In the drawing the valve casing 10 is shown as provided with ports 11 and 12, which are inlet and outlet ports, and a hood 13 is placed on top of the part 10 and also forms part of the valve casing, the parts being made separate and secured together by suitable fastening means, such as the bolts 14, to permit easier assembling and repair of the valve.

Any usual or desired type of stuffing box 15 is placed at the top through which the valve stem 16 operates, the valve stem usually being threaded and moved longitudinally by turning it by means of the hand wheel 17. So far as described the parts are of ordinary construction and are of a number of different types, according to the uses to which the valve is to be put.

The valve casing thus encloses a chamber 18, at the juncture of which chamber and the ports 11 and 12 are arranged suitable valve seats 19 against which the valves 20 are designed to be pressed to close the valve and prevent the passage of material therethrough. The valve casing, on its opposed faces where the seats are located, is substantially parallel and the valve seats 19 are tapered and the valves 20 have a central raised portion, the edges of which are tapered or inclinded to fit the valve seat 19. Any clattering or banging of the parts when the valves 20 are unseated, if it causes any indentation or marring, will be limited to the flat face of the raised part 20 or the flat faces of the opposed sides of the valve casing and the bonnet above the seats, thus saving the valve seats and the tapered part of the valves from damage. On the bottom of the valve stem I arrange a block 21 which, at its upper part 22, is arranged to receive the bottom of the valve stem 16, to which it is securely held, usually by arranging the pin 23 tangential to said valve stem and fitting in a groove therein. This permits the turning of the valve stem relative to the block, but provides for their movement together longitudinally.

The valves 20 and the block 21 are so constructed that when the stem is raised to pull the block up the valves are lifted and are suspended from the block, but when the valves are held against downward movement, this point, of course, being opposite the valve seats, and the block moves downward relative to the valves they are moved flatwise and apart so as to be firmly pressed in position on the valve seats.

To provide for this I place hooks 24 on each side of the block, which hooks project into recesses 25 on the rear faces of the valves, the lower faces 26 of the hooks and the lower walls 27 of the recesses 25 being tapered or inclined so that the hooks form a wedge when passing down toward the valves so that the valves are pressed apart.

In order to centralize pressure on the valves to make their seating more even I prefer to provide the faces 27 with dome-shaped or rounded protuberances 28 against which the faces 26 operate. Each valve has a nose 29 above the recess, the bottom face 30 of each nose being adapted to abut on the top face 31 of a hook, so that when the block is raised relative to the valves the valves are suspended from the block, and I prefer to give these faces 30 and 31 a taper downwardly and inwardly so that the weight of the valves tends to move them inwardly.

It will be evident that the recesses 25 are longer than the hooks 24 so that the upper faces of the hooks will not engage the noses 29 until after they have left the faces 27 of the recesses, and vice versa.

Suitable means for supporting the valves when they are opposite their position on the valve seats may be provided, the form shown comprising ears 32, which are slidable in grooves 33 in the valve casing, these grooves 33 being inclined outward, or enlarged, as at 34, so as to permit the flatwise movement of the valves relative to their valve seats so that the valves are halted in their downward movement approximately in position, and the block, if desired, can be similarly guided by ears 35 operating in grooves 36 in opposite sides of the valve casing between the two grooves 33.

With the exception of the valve seats and the faces of the valves that fit against them, the contacting parts are preferably loosely jointed so that once the valves are released from their valve seats their movement is easy and there is no undue friction in the valves. The hooks 24 are slightly narrower than the recesses 25 and the side walls 37 of the recesses 25 prevent any undue side motion of the block, and consequently of the stem 16, so that there is no undue lateral strain on the screw-threaded connection between the valve casing and the stem.

It will be evident that slight changes can be made in the form and disposition of the parts without departing from the scope of my invention.

I claim:

1. A gate valve comprising a valve casing having a seat therein, a valve to fit on the seat, a valve stem, a block on the valve stem, the block having a hook, the valve having a recess on the back thereof, the hook and the recess having their lower faces inclined downwardly and inwardly and disposed so as to contact substantially central on the valves, means for limiting the downward movement of the valve relative to the casing, and means on the block and on the valve to suspend the valve from the block when the block is lifted relative to the valve, the valve casing having vertical grooves in its side face, the block and the valve having ears adapted to slide in said grooves, the grooves in which the ears of the valve travel being laterally extended at a point so as to permit flatwise movement of the valve toward its seat.

2. A gate valve comprising a valve casing having opposed ports, the casing at the ports having tapered valve seats, valves having outer raised portions with their edges tapered to fit the seats, and a single means for raising and lowering the valves and for moving them laterally when opposite their seats, the casing having means for so supporting the valves as to space them from the bottom of the casing when moving laterally.

3. A gate valve comprising a valve casing having opposed ports, the casing at the ports having tapered valve seats, valves having outer raised portions with their edges tapered to fit the seats, a stem on which the valves are suspended when open and which moves the valves laterally when not suspending them, and coacting means on the valves and the sides of the casing for limiting the downward movement of the valves so as to suspend them above the bottom of the casing and permitting them a limited lateral movement.

4. A gate valve comprising a valve casing having opposed ports, the walls where the ports enter being substantially parallel and having tapered valve seats, valves having tapered portions to fit the valve seats, and means for raising and lowering the valves and for moving them laterally when opposite their valve seats, the casing having means for so supporting the valves as to space them from the bottom of the casing when moving laterally.

In testimony that I claim the foregoing, I have hereto set my hand, this 31st day of August, 1920.

JAMES F. ARNOLD.